Nov. 14, 1944.   L. B. JAHN   2,362,488
PARACHUTE
Filed June 26, 1941   4 Sheets-Sheet 1
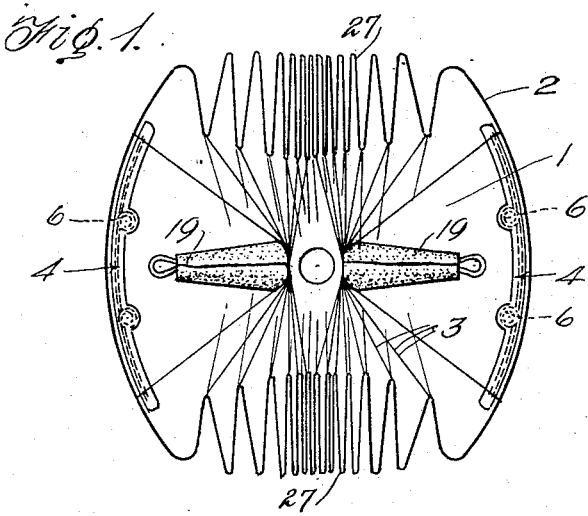
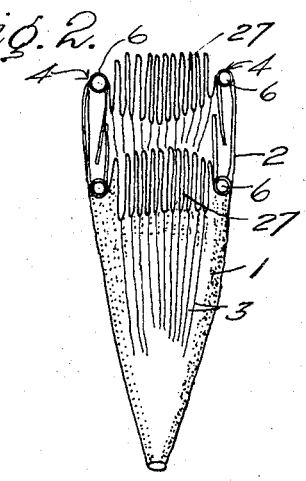
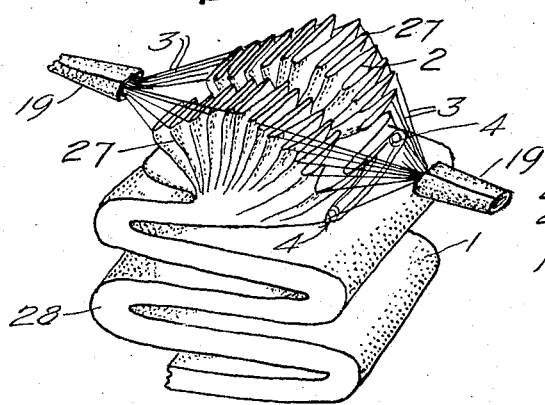
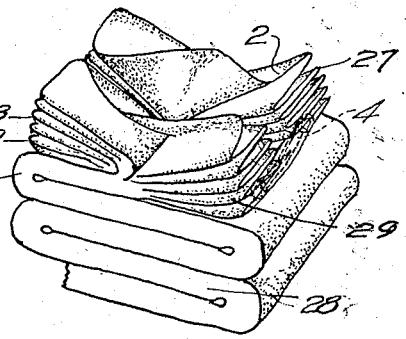
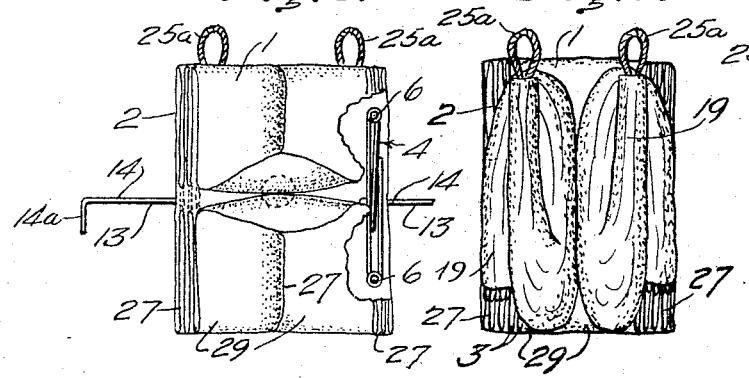
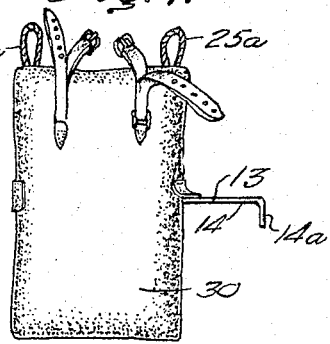
Inventor
Leroy B. Jahn,
By
Attorney Nov. 14, 1944.　　　　　L. B. JAHN　　　　　2,362,488
PARACHUTE
Filed June 26, 1941　　　　4 Sheets-Sheet 2
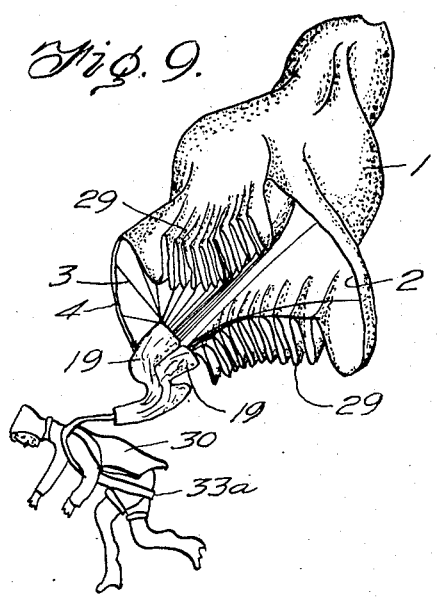
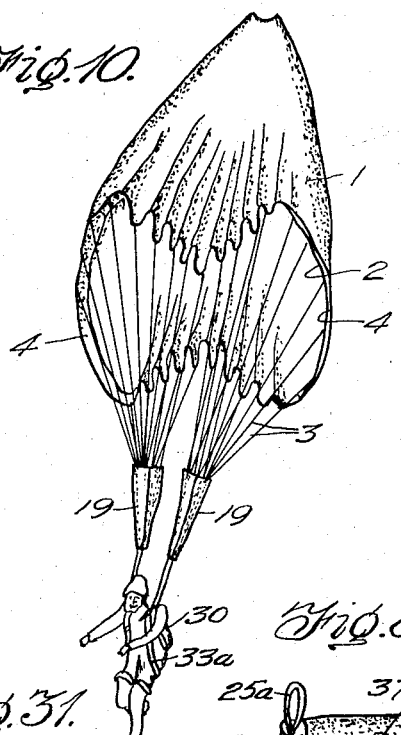
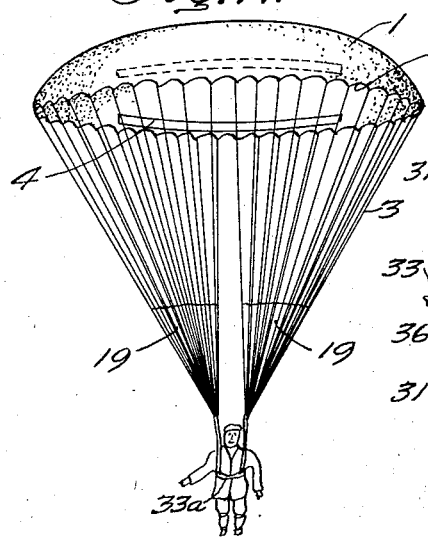
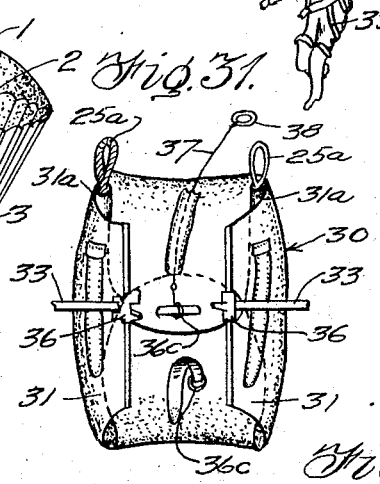
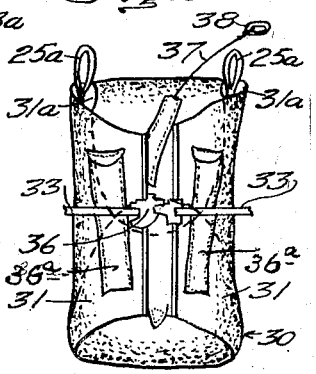
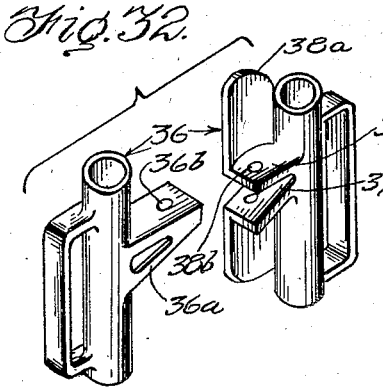
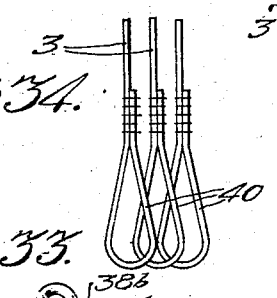
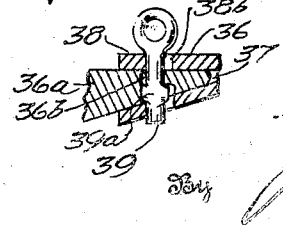
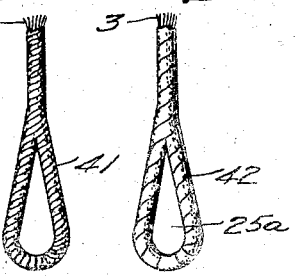
Inventor
Leroy B. Jahn, Nov. 14, 1944.     L. B. JAHN     2,362,488
PARACHUTE
Filed June 26, 1941     4 Sheets-Sheet 3
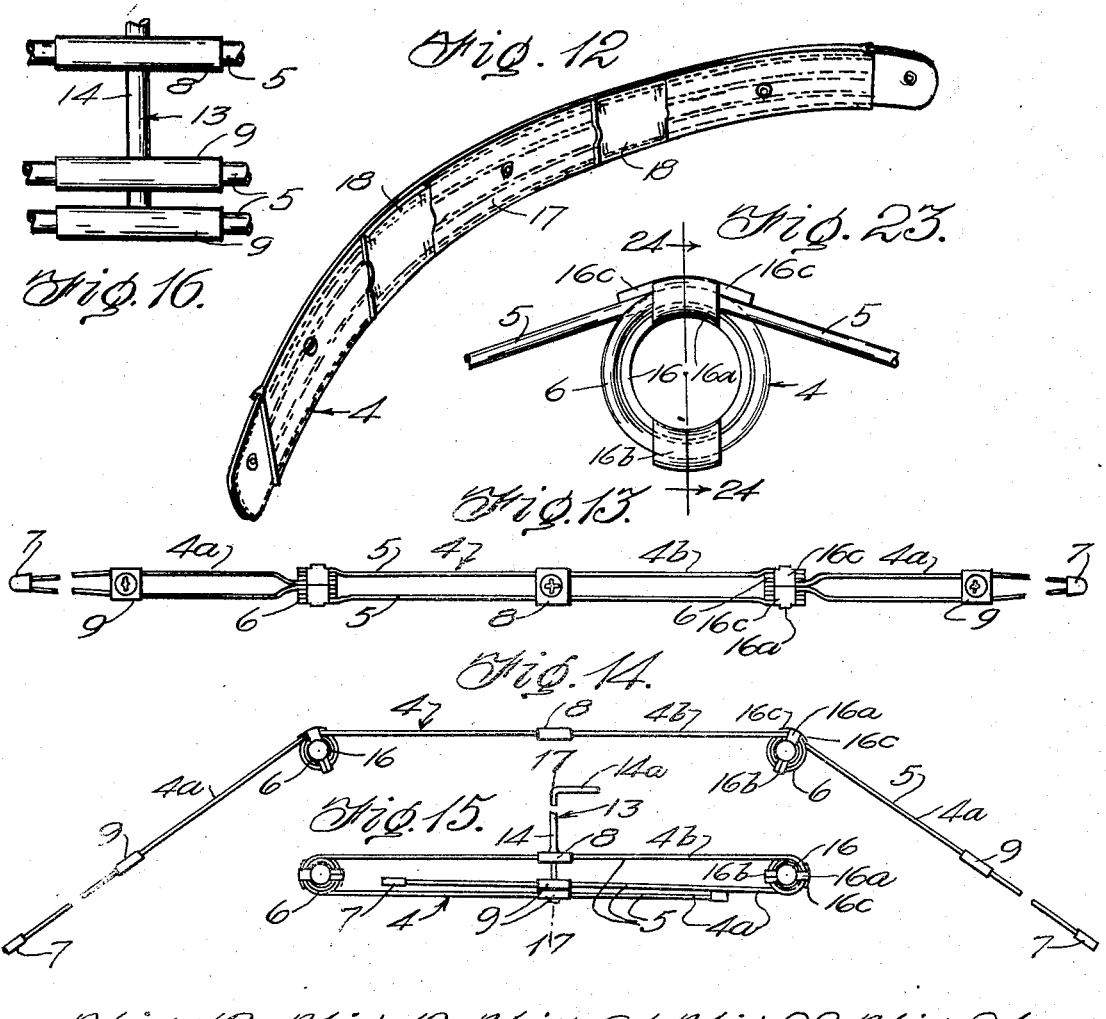
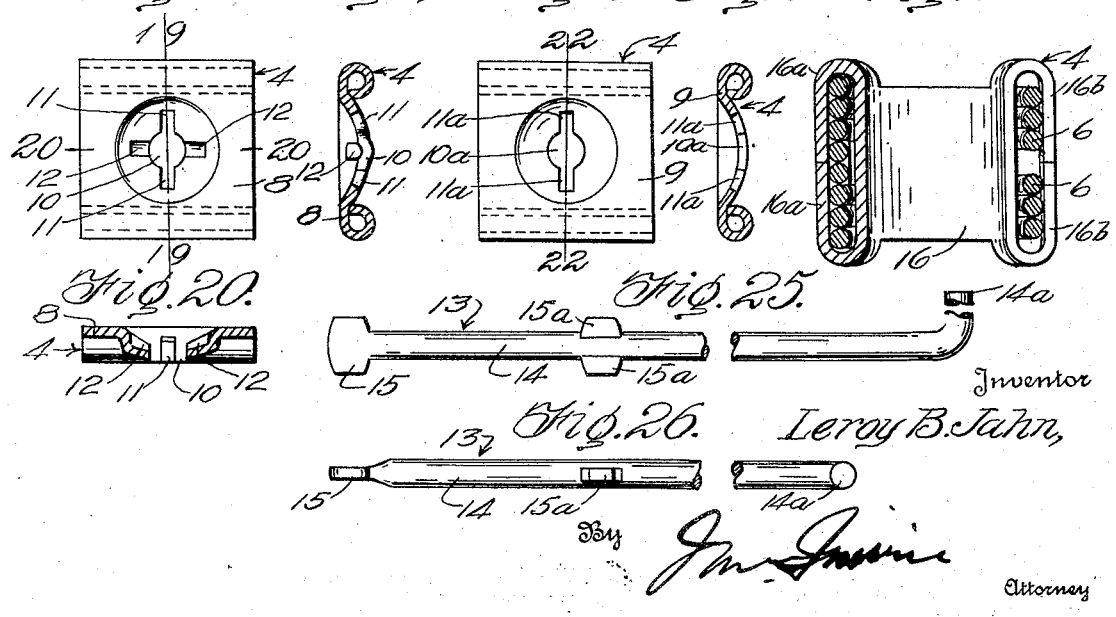
Inventor
Leroy B. Jahn,
By
Attorney Nov. 14, 1944.　　　　　L. B. JAHN　　　　　2,362,488
PARACHUTE
Filed June 26, 1941　　　　4 Sheets-Sheet 4
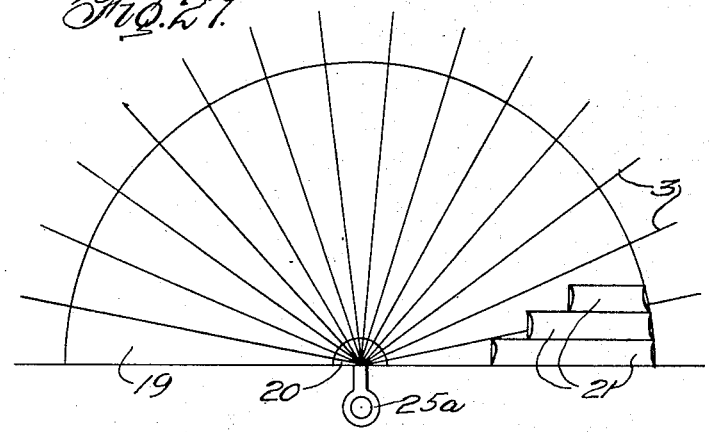
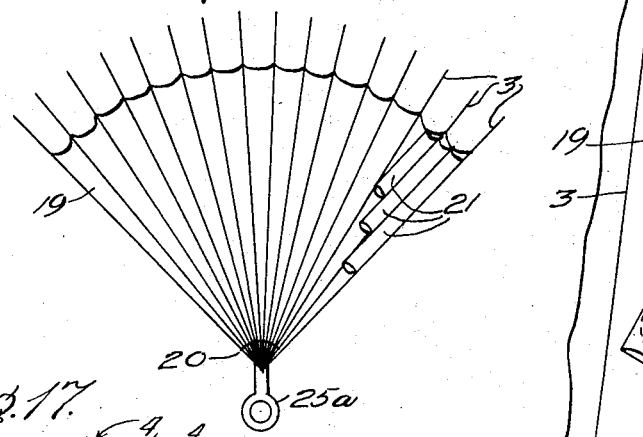
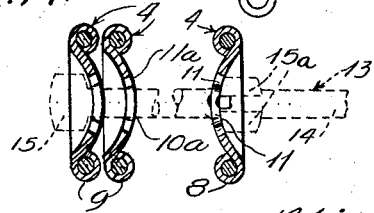
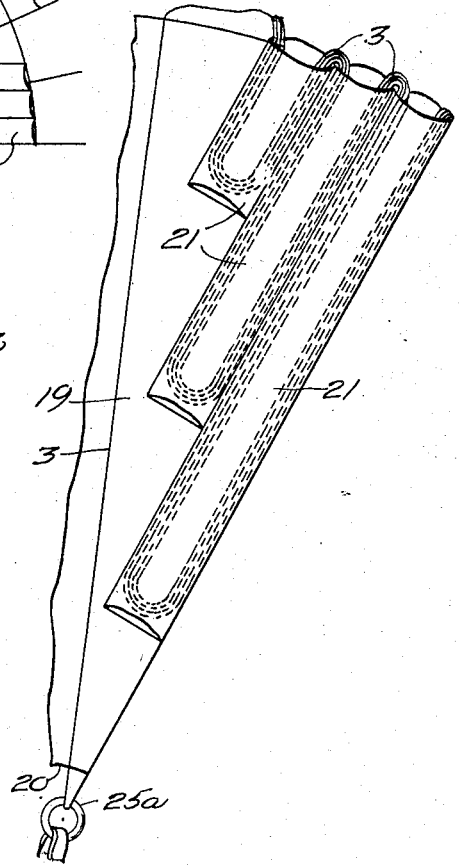
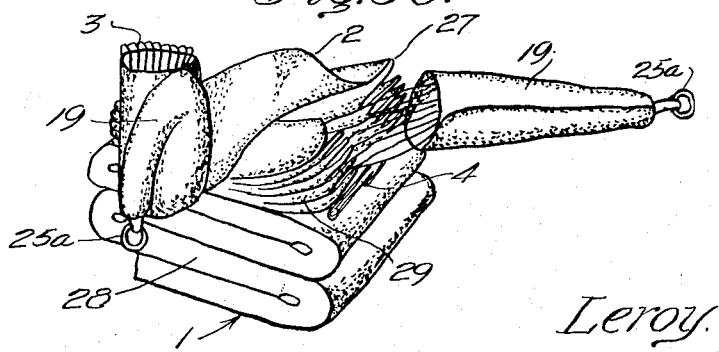
Inventor
Leroy B. Jahn,
By
Attorney Patented Nov. 14, 1944

2,362,488

UNITED STATES PATENT OFFICE 2,362,488

PARACHUTE

Leroy B. Jahn, Montevideo, Minn.

Application June 26, 1941, Serial No. 399,891

24 Claims. (Cl. 244—148)

This invention is directed to an improvement in parachutes of the positive opening type, wherein mechanical means are employed for insuring an initial opening of the parachute to an extent to compel immediate and proper distension of the parachute by the air.

A particularly important detail of the present invention is the provision of mechanical opening elements, arranged in diametrically opposed relation at the edge of the parachute body, combined with a particular manner of folding said edge intermediate said elements, and grouping the remaining portion of the body of the parachute with respect to said folded edge, with the opening elements so tensioned in the particular manner of folding in the initial spreading of the parachute edge incident to the opening of said elements when freed from their folded confinement as to immediately form spaced air pockets, with the remaining portion of the parachute so interfolded as to be easily and quickly responsive to the air entering said pockets for an absolutely unfailing and substantially immediate opening of the parachute.

Another important detail of this invention is the provision of a specific container, in which the particularly folded parachute is arranged in a compact package to be secured to the back of the user, the container being adapted, when closed or in package form, to be utilized as a means for holding the parachute opening elements in inoperative closed and tensioned position, the confining element of the container being releasable at the will of the user through a single movement, and the mechanical opening elements of the parachute initially acting to fully open the container on the release of the confining means and at the same time form initial air pockets in the parachute proper.

The invention also contemplates the provision of certain novel means effectively limiting oscillation of the user in descending, such means including oscillation preventing wings or sails associated with the lower parts of the shroud lines of the parachute and so arranged that, when the parachute is open, air will be directed along definite channels by these sails.

The invention still further contemplates the provision of housings on such sails in which the shroud lines extending from the parachute to the sails are grouped in pockets of the housings whereby all of the shroud lines may be so held in the parachute pack as to insure absolutely free movement of the shroud lines as the parachute opens, thereby preventing any possibility of these lines tangling with each other or with any portion fo the parachute body or umbrella with the sails, or with the pack and harness worn by the user.

The invention in the preferred form of details is shown in the accompanying drawings, in which Figure 1 is a bottom plan view showing the initial arrangement of the lower edge and adjacent body portions of the parachute in the initial folding operation.

Figure 2 is a perspective view with the upper portion of the parachute shown, the initial folds of the parachute edge and distending means having been completed.

Figure 3 is a perspective view showing the bottom edge in folded relation and the body of the parachute beyond said edge partly folded into layers.

Figure 4 is a perspective view showing the final relation of the parts of the parachute top or umbrella when the parachute is in package form.

Figure 5 is an elevation of the package shown in Figure 4, certain of the parts being broken away to show the interior and disclose the expansion means, the retaining keys being also disclosed as used when packing the parachute.

Figure 6 is a view similar to Figure 5 but also showing the manner of packing the shroud lines and sails.

Figure 7 is a view in elevation of the back or inner side of the container with the package therein.

Figure 8 is a similar view of the face or outer side of the container with the package therein.

Figure 9 is a perspective view showing the initial opening of the parachute when released from the package.

Figure 10 is a similar view showing the parachute partially distended and the sustaining cords or shroud lines feeding from the housings, with the sails partly closed.

Fifiure 11 is a similar view showing the parachute completely distended.

Figure 12 is a perspective view of the automatic distending means in completed form.

Figure 13 is an elevation of the automatic distending member removed from its casing.

Figure 14 is a plan view of the distending member opened.

Figure 15 is a plan view of the distending member in folded position and held in this position by a temporary locking means or key.

Figure 16 is an enlarged view of the central portion of Figure 15 better disclosing the locking arrangement.

Figure 17 is a section on the line 17—17 of Figure 15.

Figure 18 is an enlarged face view of one of the locking plates.

Figure 19 is a section on the line 19—19 of Figure 18.

Figure 20 is a section on the line 20—20 of Figure 18.

Figure 21 is a face view of another of the locking plates.

Figure 22 is a section on the line 22—22 of Figure 21.

Figure 23 is an enlarged detail plan view of one of the coils of the distending means.

Figure 24 is a section on the line 24—24 of Figure 23.

Figure 25 is a side view of a locking key used in connection with this invention.

Figure 26 is a view of said key but at right angles to Figure 25.

Figure 27 is a plan view of one of the sails laid flat and showing the shroud lines and their holding pockets.

Figure 28 is a view of the parts shown in Figure 27 but with the said sail in generally semiconical form.

Figure 29 is an enlarged view of a portion of a sail disclosing the shroud line pockets and the manner of housing the lines therein.

Figure 30 is a perspective view of the parachute partly unfolded and showing the sails and shroud lines.

Figure 31 is a view of the pack partially opened.

Figure 32 is a detail view of the locking mechanism for the pack.

Figure 33 is a detail section of same.

Figures 34, 35 and 36 are views representing the wrapping of the cords.

The parachute proper, which aside from the details hereinafter described, may be of any usual or desired form of material, including a body 1, having a free edge 2, from which edge the sustaining cords or shroud lines 3 depend. The edge 2 is provided at diametrically opposed points with the mechanical distending means, indicated generally at 4. Each distending or spreading means comprises a pair of spring wires 5 of appropriate lengths, each formed at requisite distance from each end into a spring coil 6. The spring wires are of equal length and the coils are superposed one on top of the other, as shown in Figures 13 and 34. The terminals of the pair of springs fit in a plate-like cap 7 to unite the ends of the spring elements at these points. To further retain the springs in proper operative relation, clips 8 and 9 are interposed between the coils and the terminals of the wires.

The clip 8 as shown in Figures 18, 19 and 20 is formed with an opening 10 and communicating slots 11, and at right angles to these slots with depressions 12 to accommodate a key 13. The clips 9 are similarly provided with a central opening 10a from which extends radial slots 11a so disposed, when the device is folded, as to align with the slots 10. Each clip has its edges rolled as at 5a to hold the wires 5. This key 13 consists of a rod 14 having one end flattened as at 15 to extend on opposite sides of the rod and is also flattened adjacent this end to provide lateral fins 15a. The end 15 is thin enough to pass through the slots 11 and 11a but the fins 15a are sufficiently wide as to prevent this portion of the key from passing through said slots. The key is provided with a turning handle 14a. In use, when the parts are brought to the position shown in Figure 15 the key is passed through the plates 8 and 9 and given a quarter turn which causes seating of the projecting parts of the end 15 in the grooves 12 and thus prevents accidental release of the key.

Fitted in each pair of superposed coils is a thimble 16 having upwardly and downwardly extending strap portions 16a and 16b and these portions are bent over the end convolutions of the coils to lie on the outside thereof at diametrically opposite points and from the sides of the portions 16a extend wings 16c which, as shown in Figures 14 and 23, form stops to limit the opening movement of the wires 5 as caused by the spring 6.

The distending means or spreader is completely housed within a fabric envelope 17, and these envelopes with the contained spreader are secured by stitching or otherwise to the free edge 2 of the parachute in diametrically opposed relation. There are but two spreaders used in the edge of the parachute, and these are of a length materially less than one-half the circumferential length of said edge, or in other words, the spreaders occupy but a comparatively small length of such edge.

The plate-like caps 7, at the ends of the springs, by reason of their broad bearing, insure that the spreader will maintain the proper relation to the edge and surface of the parachute. By reason of the dual superimposed spring relation and the thimbles, twisting of the spreader in the closing and folding of the parachute is prevented. The envelope 17 is formed with pockets 18, in which the springs 4 are capable of limited sliding movement, so that said springs may move, both in folding the distending means and in the automatic opening thereof, without wear on the parachute body, this wear being taken up by the envelope, which of course is readily and cheaply renewable when necessary.

The sustaining cords 3 of the parachute are connected in the usual manner to the edge thereof, and for the purpose of the folding of the parachute are divided into two groups.

Associated with each group of these cords or shroud lines is a sail 19 formed from a semi-circular sheet of parachute material such as silk or the like and having a semi-circular notch 20 at the center of the straight edge. The lines 3 are attached to this sheet at the arcuate edges and at such other places as may be necessary and these lines extend radially from the outer edge of the sheet to the notch. Thus the portions of the shroud lines 3 between the parachute top or umbrella 1 and the sails 19 are free. Each sail carries a series of shroud line storage pockets 21 which have open ends coincident with the semi-circular upper edge of the sail. The free portions of the shroud lines are stored in these pockets in a series of loops, as best seen in Figure 29 and it will be obvious that this method of storage allows the shroud lines to be pulled from one after another of the pockets as the umbrella opens, thus at no time in the opening operation allowing loose lengths of shroud line between the sails and umbrella and thereby preventing tangling of the shroud lines.

Assuming the spreaders in position and the cords grouped in the housings as described, the particular folding of the parachute in package form is carried out in the following manner: The end sections 4a of each spreader, together with the connected edge of the parachute, are folded back upon the intermediate spring section 4b, placing the coils 6 under tension.

These parts are temporarily held in folded position by the locking device, shown in Figures 15 to 26. When the springs are folded, the plates 8 and 9 register with each other, as shown in Figures 15, 16 and 17. Then the key 14 is passed through the aligned openings 10, the end passing through the slots 11 and 11a. When the key has passed through all the plates, it is given a quarter turn and the projecting parts engage in the depressions 12 and prevent withdrawal of the key, thus effectively locking the three spring sections in folded position while folding and packing the parachute. The remaining free portion of the edge 3 of the parachute is then interfolded in a series of plait-like or convolute groupings, indicated at 27, Figure 2, which include a portion of the body proper above said edge. The remaining length of the body is then laid in return folds transverse the formation provided by the edge arrangement described, this folding being indicated at 28, Figures 3 and 4. The convolute groupings 27 are then divided and turned outwardly in opposite directions, presenting a series of folds, indicated at 29, Figure 4, over each automatic distending means.

The cords or shroud lines between the edge of the parachute top or umbrella and the sails 19 are then placed in the tubes 21 and each sail rolled up with the tubes inside to form a tapered tube as shown in Figure 30. These tubes are then folded on the previously made top package parallel with the folded distending springs with the folded edges 29 between these tubes and the distending members as shown in Figures 30 and 6.

The parachute package, which is now substantially rectangular in elevation, is adapted to be encased in a container 30, comprising a section of appropriate material, folded over top and bottom onto the parachute package and having sides 31 folded over onto the top and bottom, thus completing the encasing of the parachute package. The parachute package is arranged with the folded edge, indicated at 27, next to the inner side or surface of the container, that is, this folded edge of the parachute is next to the body of the user when the completed container and parachute are secured to his person. The formation of the folding top and sides of the container is such that there is thereby provided corner openings 31a, through which the terminal loops 25a of the cords project for connection with the harness. The sides 31a of the container are provided with straps 33 which extend around the container and are secured to the harness 33a, these straps being provided with locking means 36, adapted to be released through the medium of a pull cord 37. When the parachute is in attached position, the pull cord extends over the shoulder of the user and preferably terminates in a ring or the like 38 for convenient operation of the parachutist. The top and bottom inclosing sections of the container are provided with rings 36c, secured to the respective sections in a manner to permit a proper cooperation, as shown. These rings 36c are loosely placed on the nose of one locking member of the means 36, so that in the opening of the package, the rings slide freely off such nose, as will be evident. This locking means 36 may be briefly described as a nose member 36a, secured to one side of the container, adapted to loosely fit in a recess 37 in a keeper 38 secured to the other side of the container, a pin 39 carried by pull cord 37 passes through openings in the nose and keeper. The keeper has an extension 38a formed to overlie and protect the headed end of pin 39 and prevent possible entangling engagement of parachute parts therewith. The securing straps 33 are of elastic material so that when the rings 36 are released on opening the package, the tension of the straps tends to pull the sides 31 of the container free of the package, thus adding to the opening freedom of all parts necessary to be released.

The particular construction of the lock 26 is of importance from a safety standpoint since the two locking elements are automatically retained in interlocking relation by the outward tendency of the pack cover to expand.

For instance, as shown in Figure 33, the walls of the opening 36b taper, and this opening is just sufficient in area to permit the bevelled enlarged portion 39a to pass. Then when the enlarged portion reaches the openings 38b in the member 38, the pull of the cover ends in opposite directions, pulls the member against the small portion of the pin above the enlarged portion 39a while the member 38 tends to pull in the opposite direction and pulls the enlarged portion under the wall of the opening in member 38. Thus the pin is retained in interlocked relation and can only be removed to release the pack by a direct pull on the cord 37 by the operator.

The parachute package is arranged in a particular manner within the container, that is, with the spreaders positioned lengthwise the container and immediately underlying the sides 31 of such container. It is, of course, understood that the parachute package has been relieved of the members 14 and that the spreaders are held in closed relation within the container solely by the locking means 36 of such container.

In parachute construction, it is vitally important that metal parts for connecting the parachute proper to the leather straps of the harness be avoided as the liability of wear and cutting of such metal is a disadvantage. To avoid this, I have provided, and the present invention contemplates, the construction of cords having non-metallic loops for attachment to the harness. The cords as above explained are divided between the two sails and at their ends each is formed into an appropriately sized loop 40. All the loops of each sail are grouped together and are bound by binding 41, following which, a wear resisting layer 42 of any appropriate material is wrapped throughout the loop and for some distance above the same. Thus, the sustaining eyes or loops of the parachute are integrally formed from the cords themselves, with each cord providing an independent loop, to thereby avoid the breakage of one such independent loop affecting the others. Obviously, of course, there is no metal used and the main wear on the eye or the loop is on the material 42 which may be readily renewed.

In the use of the parachute, the operator releases the locking means 36 through the pull cord, thus freeing the sides of the container. The parachute spreaders being then unrestricted instantly act to move to the open limit permitted by the stop wings 16c on the coils 6. This action throws open the sides of the container and spreads the parachute edge within and adjacent the spreaders, forming at once two pockets at opposite sides of the parachute and of course beyond the body of the user, as indicated in Figure 9 of the drawings. The intermediate convolute edge formation of the parachute is also spread to some extent by this action of the distending means, with the result that the body portion, which naturally falls from its folded relation as the container opens, is arranged in the most convenient position for the distension by the air. The pockets insure the entrance of air into the parachute, and the arrangement of the parachute resultant from its manner of folding avoids the possibility of entanglement and fully and freely responds to the entering air.

Immediately following the initial opening of the parachute, the air entering the pockets has distended the parachute body, as illustrated at Figure 10, and the sustaining cords are being fed in regular uniform order from the successive pockets of the cord housing 19. This continues until the cords are fully withdrawn and the parachute fully open, as indicated in Figure 11.

The action of parachute distension is so rapid that the user is practically suspended within a very short distance of the support from which he is jumping, and as the opening of the parachute and the feeding of the cords are simultaneous, the initial check of the fall of the user is a gradual one and without appreciable jar.

As the parachute top or umbrella 1 moves to distended position each group of shroud lines will assume a generally inverted semi-conical arrangement and the sail attached to such group will, being carried by the lower parts of the shroud lines, assume a similar position. However, since the sail here shown is, when flat, of semi-circular form there will be considerable slack of the sail material between adjacent shroud lines when the sail is in generally semi-conical shape. The result will be that the air pressure, due to the descent of the parachute on the sails, will force the slack portions inwardly and thus form a series of guide flutes or channels for the air. By reason of this sail construction any swaying or oscillation of the parachute which may occur at the time of opening will be quickly checked and all such oscillatory movement during descent will be prevented, thus insuring a smooth and safe downward movement.

As shown in Figure 8, the parachute pack is provided with a pair of pockets 14a for holding the keys.

What I claim is:

1. A parachute package, including a parachute and automatically-acting distending means secured to the parachute adjacent the free edge thereof, the free edge beyond the distending means and for a material length of the parachute being arranged in convolute folds with such convolute folds interfolding those lengths of such edge around the automatically acting distending means, that portion of the body of the parachute beyond the edge being grouped in layers transverse the first mentioned folds.

2. A parachute spring distending means secured to the parachute adjacent and substantially parallel with its free edge, such means being tensioned by folding the end portions thereof on the central portion, the free edge of the parachute intermediate the distending means being grouped in convolute folds and confined between the opposed folded distending means, whereby when free to act said distending means operate independently to open the folds of the distending means connected portions of the edge of the parachute to form spaced air pockets which act collectively to open the intermediate folds of the free portions of such edge.

3. A parachute pack having two spring distending means arranged at diametrically opposite points of the free edge of such parachute, the remaining lengths of such free edge being free of restriction, said distending members being folded upon themselves to tension the same, and the remaining lengths of such free edge being arranged in convolute folds between the folded distending members, that portion of the body above the edge being laid in return folds transverse the distending members, and cord housings wholly independent of the parachute proper, said housings serving to receive the cords of the parachute in successive folds, said housings being independently arranged upon the folded edge of the parachute between and substantially parallel with the distending members.

4. A parachute pack having two spring distending means arranged at diametrically opposite points of the free edge of such parachute, the remaining lengths of such free edge being free of restriction, said distending members being folded upon themselves to tension the same and the remaining lengths of such free edge being arranged in convolute folds between the folded distending members, that portion of the body above the edge being laid in return folds transverse the distending members, and cord housings wholly independent of the parachute proper, said housing serving to receive the cords of the parachute in successive folds, said housings being independently arranged upon the folded edge of the parachute between and substantially parallel with the distending members, and a container having sides to be spread by the said distending means, and means for locking said sides against the action of the distending means.

5. A parachute pack including a parachute proper arranged to present the edge thereof for a portion of its length in free unrestricted folds and distending-means carried by the remaining portions of such edge to compel predetermined opening of the said remaining portions of such edge to form spaced air pockets, the air entering said pockets positioning the initially folded edge in open relation between the air pockets.

6. A parachute package comprising a parachute having the free edge thereof provided at diametrically opposed points with foldable parachute distending means, said package including folded distending means, convolute interfolded free portions of the edge between the respective distending means, the remaining length of the body portion being arranged in folds transverse said convolute folds, the convolute folds being separated into two portions and turned outwardly over the distending means.

7. A parachute package including a parachute proper foldable distending means on the free edge of the parachute proper at diametrically opposed points said package including folded distending means, interfolded free portions of the edge in convolute folds between the respective distending means, the remaining length of the body portion being arranged in folds transverse said convolute folds, the convolute folds being divided into two portions and turned outwardly over the distending means, cord housings in which the sustaining cords are grouped, said housings being arranged on and transverse the divided portions of the convolute folds.

8. A terminal loop for the sustaining cords of a parachute, comprising an eye member including a number of independent cords, each cord having a terminal, independent and complete loop, the complete single cord loops being substantially aligned to provide a single loop, and a wear wrapping for such single loop.

9. A parachute, distending means therefor including foldable members adapted to automatically open when free to act to thereby form spaced air pockets within the edge of the parachute, the remaining portions of the edge of the parachute between the air pockets being formed to provide a series of auxiliary air pockets extending vertically of the parachute, the trapped air in the air pockets formed by the opening members acting immediately following such airpocket formation to enter the auxiliary air pockets to complete the distension of the said members including means aligned when the members are folded one upon the other to receive a removable holding means.

10. A parachute distending member, comprising a length of spring material formed at appropriate points in its length to provide integral coils to divide the members into a central section and relatively foldable end sections, plates carried by the spring material and adapted to register with the ends of the end sections when folded on the middle portion, said plates being provided with key-hole slots, and a removable key having a shank provided with longitudinally spaced wards engageable with the outer plates through said slots.

11. A parachute distending member, comprising a length of spring material formed at appropriate points in its length to provide integral coils to divide the member into a central section and relatively foldable end sections, and means to limit the opening of the distending member to an arcuate form, plates carried by the spring material and adapted to register with the ends of the end sections when folded on the middle portion, said plates being provided with key-hole slots, and a removable key having a shank provided with longitudinally spaced wards engageable with the outer plates through said slots.

12. A parachute distending member, comprising a pair of similar lengths of spring wire, each formed at appropriate points in its length to provide integral coils and constitute end and middle sections, the coils on one length of wire being axially aligned with the coils of the other length, and means engaging the pairs of aligned coils and holding them in alignment.

13. A parachute distending member, comprising a pair of similar lengths of spring wire, each formed at appropriate points in its length to provide integral coils and constitute end and middle sections, the coils on one length of wire being axially aligned with the coils of the other length, means engaging the pairs of aligned coils and holding them in alignment, and means holding the ends of one of the pair of wires in fixed relation to the ends of the other wire.

14. A parachute distending member, comprising a pair of similar lengths of spring wire, each formed at appropriate points in its length to provide integral coils and constitute end and middle sections, the coils on one length of wire being axially aligned with the coils of the other length, means engaging the pairs of aligned coils and holding them in alignment, means holding the ends of one of the pair of wires in fixed relation to the ends of the other wire, and clips holding the wires at each section in fixed spaced relation.

15. In combination, a parachute umbrella, shroud lines extending from the edge of said umbrella and forming a pair of groups each having the free ends of its shroud lines secured together, and segmental sails extending from the grouped free ends of the shroud lines towards the umbrella edge and having said lines secured thereto.

16. In combination, a parachute umbrella, shroud lines extending from the edge of said umbrella and forming a pair of groups each having the free ends of its shroud lines secured together, and segmental sails extending from the grouped free ends of the shroud lines towards the umbrella edge and having said lines secured thereto, each of said sails consisting of a sheet of flexible material having an arcuate top edge, said sheet being adapted to assume a flat position with the shroud lines extending radially of the sheet in such flat position whereby when in use the sail will assume an inverted segmento-conical form having fluted portions between adjacent shroud lines.

17. In combination, a parachute umbrella, shroud lines extending from the edge of said umbrella and forming a pair of groups each having the free ends of its shroud lines secured together, segmental sails extending from the grouped free ends of the shroud lines towards the umbrella edge and having said lines secured thereto, and tubular housings carried by the sails to receive the portions of the shroud lines between the sails and umbrella for packing of the parachute.

18. In combination, a parachute umbrella, shroud lines extending from the edge of said umbrella and forming a pair of groups each having the free ends of its shroud lines secured together, segmental sails extending from the grouped free ends of the shroud lines towards the umbrella edge and having said lines secured thereto, each of said sails consisting of a sheet of flexible material having an arcuate top edge, said sheet being adapted to assume a flat position with the shroud lines extending radially of the sheet in such flat position whereby when in use the sail will assume an inverted segmento-conical form having fluted portions between adjacent shroud lines, and tubular housings carried by the sails to receive the portions of the shroud lines between the sails and umbrella for packing of the parachute.

19. In combination, a parachute umbrella, shroud lines extending from the edge of said umbrella and forming a pair of groups, each group having the free ends of its shroud lines secured together to form an independent terminal for each group, and means connected to each group of shroud lines above its terminal to bridge said lines when the parachute is open.

20. A construction as defined in claim 19, wherein said means when the parachute is open provides air channels between the bridged shroud lines.

21. A construction as defined in claim 19, wherein the said means is flexible and foldable about the bridged shroud lines in packaging the parachute.

22. A construction as defined in claim 19, wherein said means is of fabric and of gradually increasing width toward the parachute.

23. A construction as defined in claim 19, wherein said means is of fabric and is provided adjacent one edge with a plurality of cord housings.

24. A construction as defined in claim 19, wherein said means is made up of a section of fabric having the group shroud lines secured throughout the length of one surface thereof.

LEROY B. JAHN.